US008965848B2

(12) United States Patent
Caceres

(10) Patent No.: US 8,965,848 B2
(45) Date of Patent: Feb. 24, 2015

(54) ENTITY RESOLUTION BASED ON RELATIONSHIPS TO A COMMON ENTITY

(75) Inventor: Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/217,027

(22) Filed: Aug. 24, 2011

(65) Prior Publication Data

US 2013/0054598 A1 Feb. 28, 2013

(51) Int. Cl.
*G06F 17/30* (2006.01)
*G06F 7/00* (2006.01)

(52) U.S. Cl.
CPC .............................. *G06F 17/30303* (2013.01)
USPC ............................ 707/626; 707/634; 707/638

(58) Field of Classification Search
USPC .......................................... 707/626, 634, 638
See application file for complete search history.

(56) References Cited

U.S. PATENT DOCUMENTS

| 7,672,833 | B2 | 3/2010 | Blume et al. | |
|---|---|---|---|---|
| 2008/0243885 | A1 | 10/2008 | Harger et al. | |
| 2009/0198678 | A1 | 8/2009 | Conrad et al. | |
| 2010/0161566 | A1* | 6/2010 | Adair et al. | 707/690 |
| 2010/0293195 | A1 | 11/2010 | Houghton | |
| 2011/0047167 | A1* | 2/2011 | Caceres | 707/749 |
| 2012/0136812 | A1* | 5/2012 | Brdiczka | 706/12 |

FOREIGN PATENT DOCUMENTS

| CN | 102110087 A | 6/2011 |
|---|---|---|
| WO | 2011020880 A1 | 2/2011 |

OTHER PUBLICATIONS

Sofus A. MacSkassy et al., "Data Mining in the Context of Entity Resolution: Four Lessons and an Opportunity," KDD 2008 DMBA Workshop, Aug. 2008: pp. 1-18, <http://www.liaad.up.pt/dmbiz/dmba08/ppts/4.pdf>.
John Talburt, "Entity and Identity Resolution," MIT IQ Industry Symposium, Jul. 2010: pp. 1-65, <http://mitiq.mit.edu/IQIS/2010/Addenda/T2A%20-%20JohnTalburt.pdf>.
Zhaoqi Chen et al., "Exploiting Context Analysis for Combining Multiple Entity Resolution Systems," ACM SIGMOD '09 Proceedings of the 35th SIGMOD International Conference on Management of Data, Jun./Jul. 2009: pp. 1-12.
Heiko Stoermer et al., "Feature-Based Entity Matching: The FBEM Model, Implementation, Evaluation*," CAiSE '10 Proceedings of the 22nd International Conference on Advanced Information Systems Engineering, 2010: pp. 180-193.
Steven Euijong Whang et al., "Generic entity resolution with negative rules," The VLDB Journal, 2009, vol. 18: pp. 1261-1277.
PCT, International Search Report and Written Opinion for PCT/IB2012/053144, dated Nov. 15, 2012.

* cited by examiner

*Primary Examiner* — Mariela Reyes
(74) *Attorney, Agent, or Firm* — Patterson & Sheridan, LLP

(57) ABSTRACT

Techniques are disclosed for resolving entities based on relationships to a common entity. In one embodiment, two entities are compared to determine that an entity resolution threshold is not satisfied. One or more entities commonly related to the two entities are determined. The two entities are determined to satisfy the entity resolution threshold on the basis of the one or more commonly-related entities. The two entities are then resolved into a single entity.

24 Claims, 8 Drawing Sheets

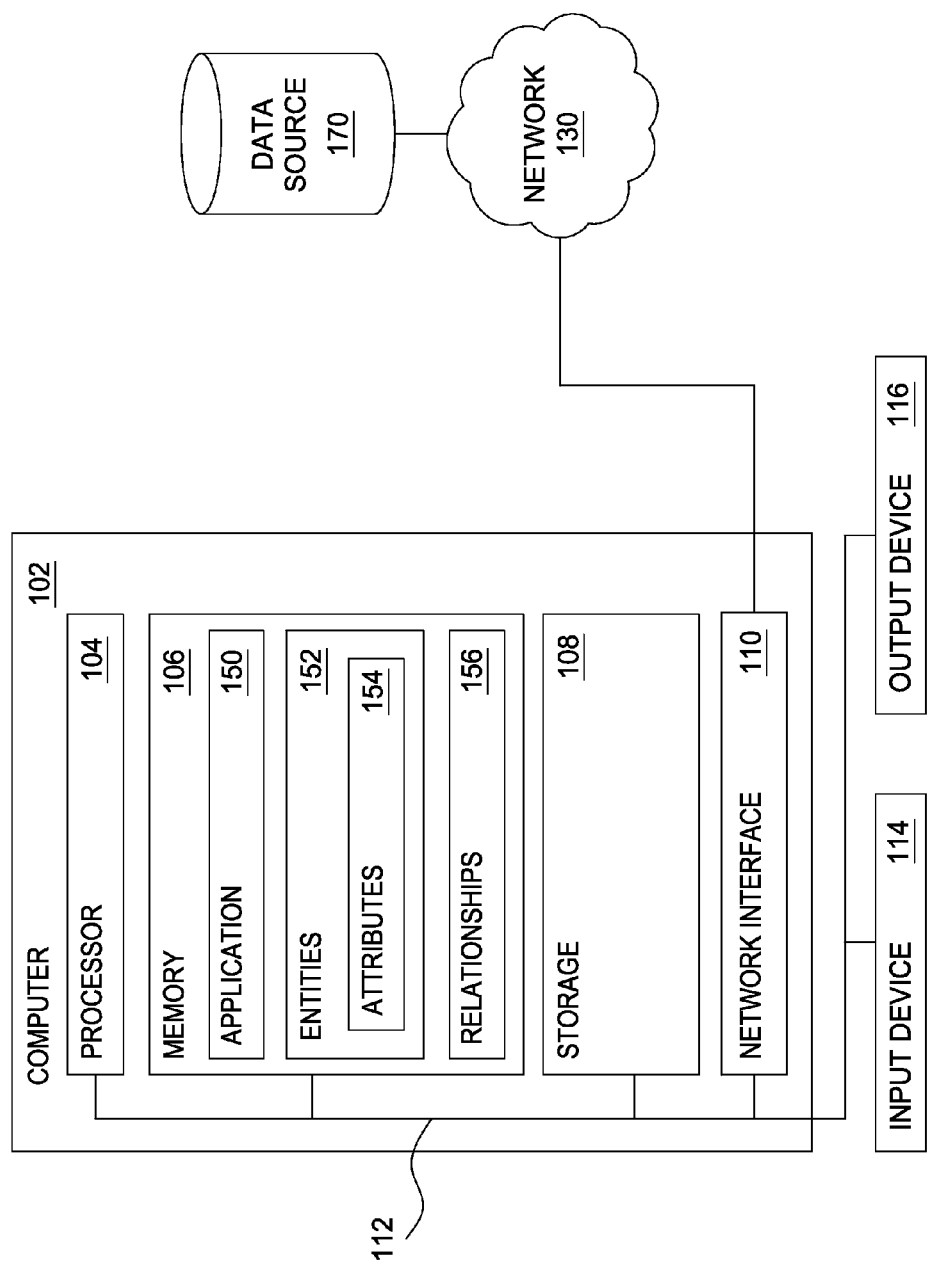

ENTITY RESOLUTION BASED ON RELATIONSHIPS TO A COMMON ENTITY

BACKGROUND

Entity resolution applications typically perform one or both of entity resolution and relationship resolution. Entity resolution attempts to answer the question "Who is who?"—i.e., to determine whether multiple data records actually refer to the same physical entity or different physical entities. For example, data records identifying two women with different last names may in fact refer to the same woman having both a familial surname and a married surname. Relationship resolution attempts to answer the question "Who knows whom?" in order to determine benefits and/or risks of relationships among identities, such as customers, employees, vendors, and so forth, e.g., by cross-referencing data from various sources. For example, a relationship may be identified between two individuals sharing a common address or telephone number. An example of an entity resolution application is InfoSphere Identity Insight, available from International Business Machines Corp. (IBM®) of Armonk, N.Y.

SUMMARY

Embodiments of the invention provide a computer-implemented method, computer program product and system for performing an operation that includes determining a likeness score between a first entity and a second entity in an entity resolution system. Each entity includes one or more identity records representing a corresponding physical entity assumed to exist by the entity resolution system. Further, each identity record includes a data record containing one or more attributes characterizing the corresponding physical entity. The operation also includes determining that the likeness score does not satisfy a defined threshold for resolving the first entity and the second entity into a single entity. The operation also includes identifying a set of one or more entities related to the first entity and a set of one or more entities related to the second entity. The operation also includes adjusting the likeness score based on an intersect of the two sets and by operation of one or more computer processors, wherein the intersect includes at least a third entity. The operation also includes upon determining that the adjusted likeness score satisfies the defined threshold, determining that the first entity and the second entity represent the same physical entity within the entity resolution system.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 1A is a block diagram illustrating a system for entity resolution, according to one embodiment of the invention.

DETAILED DESCRIPTION

Figure 1B:
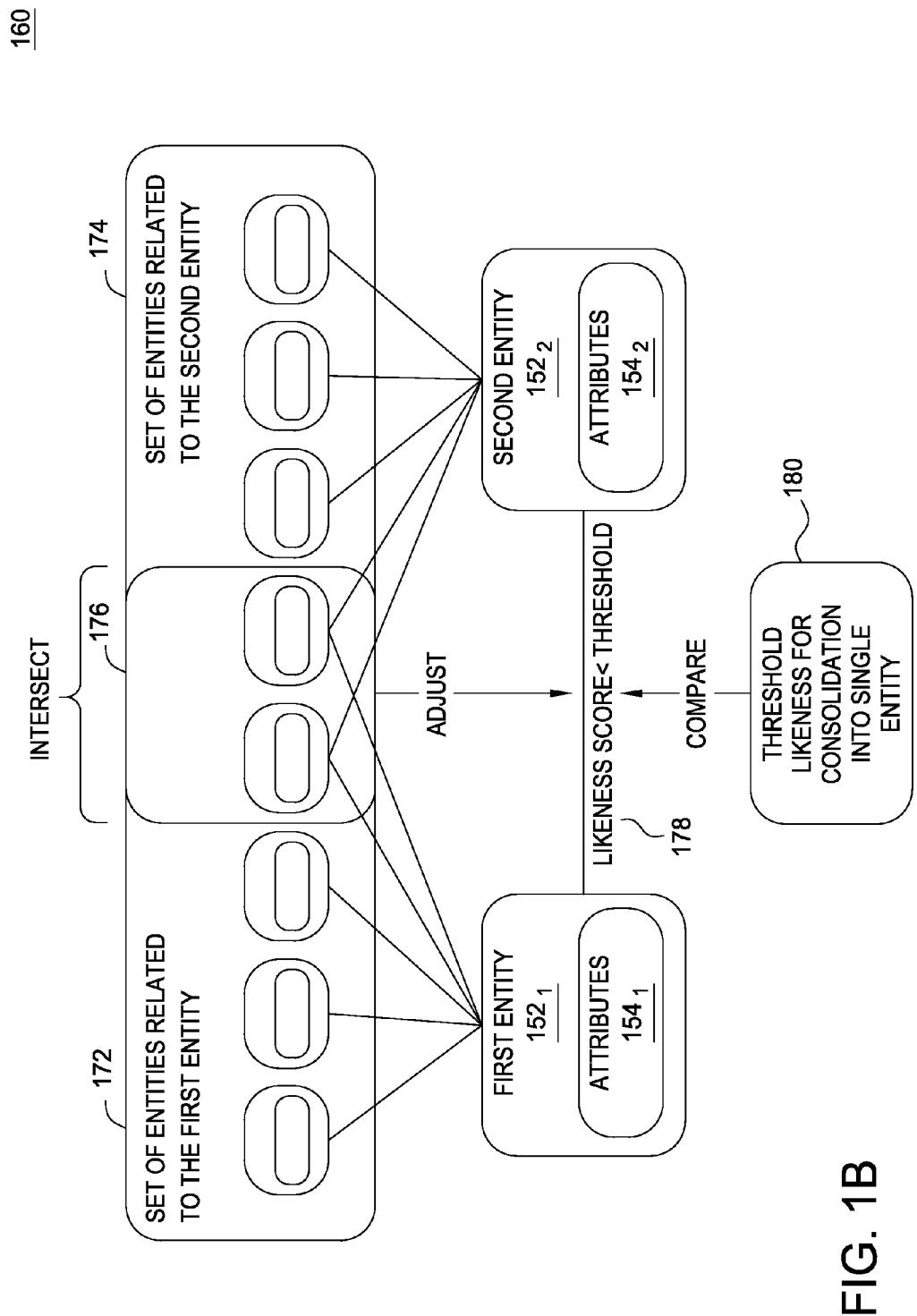
FIG. 1B depicts a technique for resolving entities based on commonly related entities, according to one embodiment of the invention.

Embodiments of the invention provide an application for entity resolution configured to process data records based on relevant identities, entities, conditions, activities or events. In one embodiment, the application maintains a universe of knowledge of distinct physical entities known to the entity resolution system—or more specifically, assumed by the entity resolution system to exist in the physical world. In the entity resolution system, each physical entity is represented by a respective logical entity, also referred to herein as an entity. Each logical entity is a set of one or more data records determined to pertain to the physical entity represented by the respective logical entity—i.e., as opposed to other physical entities known to the entity resolution system. Put another way, each logical entity is a set of data records containing one or more attributes describing the particular physical entity that is represented by the respective logical entity. A data record is also referred to herein as an identity record. A logical entity representing a physical entity known to the entity resolution system is also referred to as a known (or existing) logical entity. A physical entity may be any identifiable entity believed by the entity resolution system to exist in the physical world, such as individual, an organization, a location, a building, a vehicle, an animal, an object, etc.

In one embodiment, when the application processes a newly received data record (or re-processes an existing data record), the application determines whether the data record being processed pertains to a physical entity known to the entity resolution system. If so, the application adds the data record to the set for the physical entity—i.e., the data record being processed and the set representing the physical entity are consolidated or merged into a single logical entity. Depending on the embodiment, the data record being processed may also be regarded by the entity resolution system having its own logical entity of which the data record is part. Determining that the data record (or its logical entity) pertains to a particular physical entity known to the entity resolution system may also be referred to herein as "resolving" the data record (or its logical entity) to the logical entity representing the particular physical entity.

In some embodiments, the application may also determine that a data record should no longer belong in a given logical entity. In such cases, the data record may be removed from the given logical entity and assigned to a different or new logical entity. Removing a data record from a logical entity may also be referred to herein as "splitting" the data record from the logical entity.

In some cases, it may be possible that the application does not resolve a given data record to any known, logical entity. In such cases, it can be said that the application determines that the data record resolves to its own logical entity in the entity resolution system. In some embodiments, the application may additionally create a relationship between the logical entity of the data record and a known, logical entity in the entity resolution system. In other words, although the application did not resolve the data record to any known, logical entity, the application may nevertheless determine that the data record describes a physical entity that bears some relationship to a known, physical entity. For example, the relationship may refer to an employer-employee relationship, a spousal relationship, a vendor-customer relationship, etc. The determination may be made at least in part based on information contained in the data record.

For convenience of reference only, a "data record to be processed" may be referred to herein as an "inbound identity record." In other words, an inbound identity record refers to any identity record that is to be evaluated (or re-evaluated) against known, logical entities, to determine whether to resolve the identity record to (or split the identity record from) a known, logical entity.

As described above, a logical entity (or entity) refers to a set of one or more identity records that are believed by the entity resolution system to describe the same physical entity. As an example, when "Bob Smith" checks into a hotel room, a home address and telephone number from hotel check-in records may be used to match him as being the same person as a "Robert Smith" having the same address and phone number. To match "Bob Smith" to "Robert Smith," the identity record describing "Bob Smith" is compared to a set of entities, each representing a distinct individual.

In one embodiment, the process of resolving identity records and detecting relationships between entities may be performed using pre-determined or configurable entity resolution rules. Typically, relationships between two entities are derived from information (e.g., a shared address, employer, telephone number, etc.) in identity records relating to the entities that indicate a relationship between the two entities. Two examples of such rules include the following:
  If the inbound identity record has a matching "Social Security Number" and close "Full Name" to an existing entity, then resolve the inbound identity record to the existing entity.
  If the inbound identity record has a matching "Phone Number" to an existing entity, then create a relationship between an entity of the inbound identity record and the one with the matching phone number.
The first rule adds a new inbound record to an existing entity, where the second creates a relationship between two entities based on the inbound record. Of course, the entity resolution rules may be tailored based on the type of inbound identity records and to suit the needs of a particular case.

In one embodiment, the application for entity resolution may also include rules for detecting relevant identities, identities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an identity with an assigned role of "Employee" has a strong relationship to an identity with an assigned role of "Vendor"). As another example, an alert rule may be defined as a combination of both methods (e.g., alert whenever an identity with the "Nevada Gaming Black List" role also has the "Hotel Guest" role and the hotel involved is located in the state of "Nevada"). Of course, the relevance rules used may be tailored to suit the needs of a particular case.

In one embodiment, the application generates an alert when the existence of a particular identity record (typically an inbound record being processed) causes some condition to be satisfied that is relevant in some way and that may require additional scrutiny by a user (e.g., a business analyst, an investigator of a police department, etc.). The result of these processes is typically a list of alerts about identities that should be examined by the user. Such alerts may assist the user in identifying both benefits (e.g., potential opportunities) and risks (e.g., potential threats and/or fraud).

In one embodiment, the application evaluates attributes in conjunction with relationships to determine whether a first entity and a second entity should be resolved into a single entity. To this end, the application may compare the first entity with the second entity to determine that the first entity and the second entity nearly satisfy an entity resolution rule. More specifically, the application may compare attributes of the first entity and the second entity to determine a likeness score for the two entities. The entity resolution rule specifies criteria for resolving the first entity and the second entity into a single entity.

In some cases, an identity record may come close to satisfying the entity resolution rule by having a likeness score narrowly falling short (e.g., by no more than a prescribed numerical extent) of a threshold score defined by the entity resolution rule. In such a case, the application may identify entities related to the first entity and the second entity. The application adjusts the likeness score based on the entities commonly related to the first entity and the second entity. At least in some cases, the likeness score may be adjusted past the threshold. Put another way, the first entity and the second entity may be determined to satisfy the entity resolution rule, based on the first entity and the second entity being related to a third entity. For example, assume an identity record for Jenny Smith does not satisfy an entity resolution rule that, upon being satisfied, would trigger resolving the identity record to an entity with a name of Jennifer Smith. Assume further that both Jenny Smith and Jennifer Smith have a relationship with a third person—Robert Smith. In such a case, the application could reevaluate the likeness score for the identify record (of Jenny Smith) and the entity of Jennifer Smith, based on the shared relationship to a third party (Robert Smith). Assuming this raises the likeness score past the threshold set for a particular case, the inbound identity record would then be resolved to entity representing Jennifer Smith.

Further, although embodiments are described herein with reference to the threshold score being defined by entity resolution rule, other embodiments are broadly contemplated. For example, in an alternative embodiment, the threshold score may be a parameter defined by the entity resolution system. In such embodiments, the threshold score is not associated with any particular entity resolution rule.

Advantageously, by evaluating attributes in conjunction with relationships, the application may perform entity resolution with an improved accuracy at least in some cases, relative to alternative approaches that merely consider attributes and not relationships in resolving entities. For instance, the application may correctly resolve two entities into a single entity even in cases where the attributes are insufficient to indicate that the two entities should be resolved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time and from anywhere across the Internet. In context of the present invention, the application for entity resolution may execute in the cloud. Having the application execute in the cloud allows the user to manage the entity resolution from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1A is a block diagram illustrating a system 100 for entity resolution, according to one embodiment of the invention. The networked system 100 includes a computer 102 that is connected to a data source 170 via a network 130. The computer 102 may also be connected to other computers via the network 130. The data source 170 stores identity records to be sent to the application 150 and/or entities that the identity records are resolved against. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. (Note: Linux is a trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices. Further, as described above, the application 150 receives identity records and/or entities from the data source 170. Additionally or alternatively, the application 150 may also receive identity records and/or entities via the storage 108.

The input device 114 may be any device for providing input to the computer 102. For example, a keyboard and/or mouse may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen may be used.

As shown, the memory 106 of the computer 102 includes an application 150 for entity resolution, entities 152 and relationships 156 between the entities 152. As described above, the application 150 may process inbound identity records to resolve the inbound identity records to one or more of the entities 152. Each identity record may include one or more attributes 154. In some embodiments, an inbound identity record may also be regarded as a new entity by the application 150—at least until the application 150 determines whether to resolve the new entity as referencing an already known entity. Each relationship 156 may be a disclosed relationship or a discovered relationship. As used herein, a disclosed relationship refers to any user-specified relationship between entities, such as an emergency contact in an employee file, references on an employment application, beneficiaries on an insurance policy, etc. A discovered relationship refers to any relationship that is not user-specified and that is inferred by the application 150 based on similarities between attributes of entities. At least in some embodiments, the application 150 creates a discovered relationship between two entities when attributes of the two entities are sufficient to indicate that the entities are likely related but insufficient to indicate that the entities should be resolved into a single entity. For example, a discovered relationship may be created when two entities share a single matching attribute, such as a phone number, an address, or a credit card number.

As described above, in one embodiment, the application 150 processes inbound identity records to resolve the inbound identity records to one or more of the entities 152. At least in some embodiments, it may be too costly in terms of time and/or processing to compare an inbound identity record to all known entities. Accordingly, in one embodiment, the application 150 may evaluate the inbound identity record against only a subset of the known entities, referred to as candidate entities or simply "candidates." The candidates may be selected based on one or more candidate-building attributes. For example, if the candidate-building attribute is a phone number, then entities with an identity record having the same phone number as the inbound identity record are selected as candidate entities. Evaluating the inbound identity record against only the candidates may improve performance of the application 150, at least in some cases.

In one embodiment, once the candidates are selected, the application 150 may determine whether to resolve the inbound identity record to one of the candidates. This determination may be made by further evaluating the candidates based on other attributes (i.e., attributes other than the candidate-building attributes). For example, if the inbound identity record contains the same phone number, address, name and date of birth as a candidate entity, then the inbound identity record and the candidate likely represent the same individual. Accordingly, the application 150 may resolve the inbound identity record and the candidate entity into a single entity. Alternatively, if no candidate entity has corroborating attributes, then the inbound identity record is presumed to refer to a new entity (such as to an individual not yet "known" to the entity resolution system). In such a case, the application 150 may create a new entity based on the inbound identity record.

In one embodiment, to determine whether to resolve the inbound identity record to one of the candidate entities, the application 150 determines a "likeness score" between the inbound identity record and each candidate entity. The likeness score for a given candidate entity characterizes an extent to which attributes in the given candidate entity match attributes in the inbound identity record. The application 150 may then select the candidate entity having the highest likeness score. If the likeness score of the selected candidate (having the highest likeness score) exceeds a threshold defined by an entity resolution rule for resolving two entities into a single entity, then the application 150 resolves the inbound identity record to the selected candidate. Otherwise, the application 150 stores the inbound identity record as a new entity. In some embodiments, by repeating the steps described above, the inbound identity record and multiple candidate entities may be resolved into a single entity. Further, in some embodiments, if the likeness score of the selected candidate at least meets a lower threshold for establishing relationships between entities, the application 150 may also create a discovered relationship between the new entity and the candidate entity. The lower threshold may be defined by an entity resolution rule for creating a relationship between two entities (rather than resolving the two entities into a single entity). The application 150 may also determine a relationship strength for the discovered relationship, based on the likeness score of the selected candidate.

In one embodiment, the likeness score between the inbound identity record and a given candidate entity may be determined based one or more predefined scoring rules. The scoring rules may assign relative weights to each matching or non-matching attribute, and each weight may be positive or negative. The scoring rules may also assign a commonality factor to a matching attribute. The commonality factor characterizes a frequency with which a portion or all of a matching attribute occurs in the entity resolution system. For example, suppose that there is a partial match between the name "James Smith Robinson" of an inbound identity record and the name "James Smith" of a candidate entity. If the application 150 also determines that the name of "James Smith" is a commonly encountered in the entities stored in the entity resolution system, then the application 150 may reduce (or eliminate) the extent to which the partial match contributes to the likeness score. Additionally or alternatively, if the application 150 determines that a matching name is rarely encountered in the entities stored in the entity resolution system, then the application 150 may increase the extent to which the matching name contributes to the likeness score. The extent to which an attribute value occurs in the entity resolution system may be maintained in the form of frequency statistics and made available to the application 150. In other embodiments, the frequency statistics may be determined based on data sources other than the entity resolution system, such as an external database of names.

At least in some embodiments, the likeness score is computed via two phases: an initial phase in which a base likeness score is computed and an adjustment phase in which one or more adjustments are made to the base likeness score to produce the (final) likeness score. For example, during the initial phase, a matching name and address may yield a score of one hundred, which may be the minimum score for resolving the inbound identity record. On the other hand, if the application 150 subsequently determines, during the adjustment phase, that the birthdates do not match, then the application 150 may lower the likeness score by an associated amount (e.g., by twenty), thus preventing the identity record from being resolved. For example, the inbound identity record and the candidate entity may represent two different individuals who resided at the address at different points in time. The predefined scoring rules may specify whether each matching or non-matching attribute is considered in the initial phase or the adjustment phase. In an alternative embodiment, the likeness score is computed in a single phase, taking into account all weights and matching and/or non-matching attributes specified by the predefined scoring rules.

In some embodiments, to improve performance of the application 150, the predefined scoring rules may also specify threshold scores for considering adjustments. For example, a maximum threshold score of two hundred may be specified, because negative adjustments are unlikely to (and positive adjustments will not) influence the outcome of resolving an inbound identity record to a candidate entity, where the candidate entity has a likeness score of two hundred or greater. A threshold score may also be specific to a given adjustment. For example, a minimum threshold score of ninety-five may be specified for an adjustment that potentially increases the likeness score by five, because a total of one hundred triggers the inbound identity record to be resolved. In some cases, a threshold score lower than ninety-five may be desirable, because other adjustments may help increase the score sufficiently to trigger the inbound identity record to be resolved. Accordingly, using threshold scores for considering adjustments, the application 150 may avoid incurring processing time and/or costs associated with unnecessarily comparing attributes and/or computing adjustments at least in some cases. At least in some embodiments, the application 150 retrieves metadata indicating which adjustments are known to be processing-intensive. Based on the metadata, the application 150 may selectively avoid performing the processing-intensive adjustments. Accordingly, using the techniques disclosed herein, the tradeoff between efficient processing and accurate scoring may be configured by a user to suit the needs of a particular case.

In one embodiment, the application 150 adjusts the likeness score based on one or more entities commonly related to: (i) a first entity representing the identity record and (ii) a candidate entity. For example, the likeness score may be adjusted based on a count of the one or more entities, a relationship strength of the one or more entities to the first entity (and/or to the candidate entity), and/or a number degrees of separation of the one or more entities from the first entity (and/or from the candidate entity). The candidate entity may be selected based on having the highest likeness score, relative to other candidate entities.

In one embodiment, the one or more entities may be identified based on relationships associated with the first entity and/or the candidate entity. In some embodiments, the relationships may be represented in a form of a relationship graph associated with the first entity and/or the candidate entity. As used herein, a relationship graph refers to any graph representing entities as vertices and representing associations between entities as edges. The one or more entities may be identified by traversing the relationship graph. Depending on the embodiment, the relationship graph may either be generated in advance or dynamically generated during or immediately prior to traversal. As used herein, a first entity and a second entity are said to have a commonly related third entity if there is a path from the first entity to the second entity through the third entity, where the path satisfies predefined path criteria. The path criteria may specify a maximum number of degrees of separation between any two of the three entities. More simply, C is said to be "commonly related" to A and B, if C is related to both A and B within the maximum number of degrees of separation. Additionally, the path criteria may specify a minimum relationship strength of any segment of the path. The path criteria may specify that no entity should appear twice in the path. Doing so prevents relationships of a related entity from being incorrectly classified as related entities in cases where the maximum number of degrees of separation is greater than one.

For example, suppose entity C is commonly related to entities A and B. More specifically, suppose entity C has one-degree relationships to entities A and B, respectively. Suppose entity C also has a one-degree relationship to entity D. Instead of designating entity D as also being commonly related to the entities A and B by virtue of the path {A, C, D, C, B}, the path is disqualified because C occurs twice in the path. In other words, just because C is commonly related to A and B does not also automatically make other one-degree relationships of C (such as entity D) to be commonly related to A and B. However, entity D may nevertheless be designated as being commonly related to the entities A and B via another path, such as through entities E and F (e.g., via a path {A, E, D, F, B}). After adjusting the likeness score based on the one or more entities commonly related to the first entity and the candidate entity, the application 150 may determine whether the candidate entity satisfies the entity resolution rule. If so, the application 150 resolves the first entity and the candidate entity into a single entity.

In one embodiment, when traversing the relationship graphs, relationships between the first entity and the candidate entity are disregarded (including disclosed relationships and discovered relationships). Doing so prevents the application 150 from incorrectly identifying entities as being commonly related to the first entity and the candidate entity. For example, suppose that entity A is related to entity B and that entity B is related to entity C. Suppose further that entity A and entity C are only related via entity B. Disregarding the relationship between entity A and entity B prevents entity C from being incorrectly identified as an entity that is commonly related to entity A and entity B.

FIG. 1B is a visual depiction 160 of a technique for resolving entities based on commonly related entities, according to one embodiment of the invention. As described above, the application 150 determines a likeness score 178 between a first entity $152_1$ and a second entity $152_2$, based on attributes $154_1$, $154_2$ contained in the first and second entities $152_1$, $152_2$, respectively. The likeness score 178 does not satisfy a threshold likeness 180 for consolidating (or merging) the first entity and the second entity into a single entity. In other words, the likeness score is insufficient for the application 150 to conclude that the first entity and the second entity represent to the same physical entity. In one embodiment, the application 150 determines a set of entities 172 related to the first entity $152_1$ and a set of entities 174 related to the second entity $152_2$. The application 150 then determines the intersect 176 between the two sets 172, 174. The intersect includes only those entities commonly related to both the first entity $152_1$ and the second entity $152_2$. The application 150 then adjusts the likeness score 178 based on the intersect. If the adjusted likeness score exceeds the threshold likeness 180, then the application 150 consolidates the first entity and the second entity into a single entity.

Figure 2:
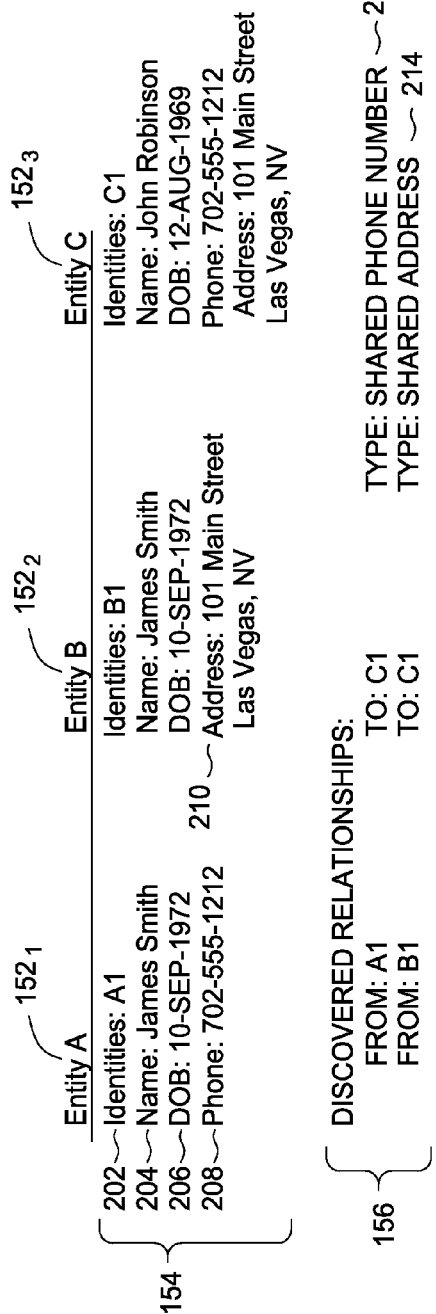
FIG. 2 illustrates an example of entities for which an application for entity resolution may adjust a likeness score based on discovered relationships, according to one embodiment of the invention.

FIG. 2 illustrates an example of entities for which the application 150 may adjust a likeness score based on discovered relationships, according to one embodiment of the invention. The example is presented in a context of two roommates, James Smith and John Robinson. Of course, those skilled in the art will recognize that the examples presented herein are merely illustrative and are not intended to be limiting of embodiments of the invention. As shown, the entities include entity A $152_1$, entity B $152_2$, and entity C $152_3$. Assume that entity A contains the inbound identity record, that entity B is the candidate entity, and that entity C is an entity that is related to at least one of entity A and entity B. The entities include the following attributes: an identity record indicator 202, a name 204 and a date of birth 206. In addition, entities A and C include an attribute representing phone number 208, and entities B and C include an attribute representing address 210. As shown, entities A and B have matching names 204 and dates of birth 206. At least in some circumstances, matching names and dates of birth may be sufficient to trigger resolving entities A and B into a single entity.

However, suppose that the name "James Smith" is a common occurrence in the entity resolution system. As a result, the likeness score may be insufficient (or may be adjusted to become insufficient) to trigger resolving entities A and B into a single entity. On the other hand, the application 150 infers (or has previously inferred) that entities A and B are commonly related to entity C. More specifically, application 150 infers (or has previously inferred): (i) a relationship 212 between entities A and C based on a matching phone number and (ii) a relationship 214 between entities B and C based on a matching address. As described above, these relationships are referred to as discovered relationships. In one embodiment, the application 150 increases the likeness score between entities A and B, based on the commonly-related entity C. The likeness score is increased because it may generally be unlikely that John (entity C) has had, as roommates, two distinct individuals having the same name and date of birth, however common the name may be. If the increased likeness score satisfies the threshold defined by the entity resolution rule, then the application 150 resolves entities A and B into a single entity. Accordingly, the presence of the commonly-related entity C may, in effect, trigger entity A and B to be resolved at least in some cases, such as where the likeness score falls narrowly short of the threshold defined by the entity resolution rule.

In one embodiment, a least in part as a result of generating and/or traversing the relationship graph, it may be costlier (in terms of processing time and/or computational resources) to determine whether two entities have a commonly related entity—as compared to determining whether two entities have a particular matching attribute. Accordingly, in some embodiments, the application 150 is configured to identify commonly-related entities only if the likeness score falls short of the threshold by a prescribed extent, e.g., within ten points of the threshold of one hundred points. Doing so may prevent the application 150 from unnecessarily identifying commonly-related entities in at least some cases, such as where any increase in the likeness score would still be insufficient to trigger entity resolution. The prescribed extent may be user-specified and/or tailored to suit the needs of a particular case. Accordingly, the user also may manage a tradeoff between efficient processing and accurate scoring in this context.

Figure 3:
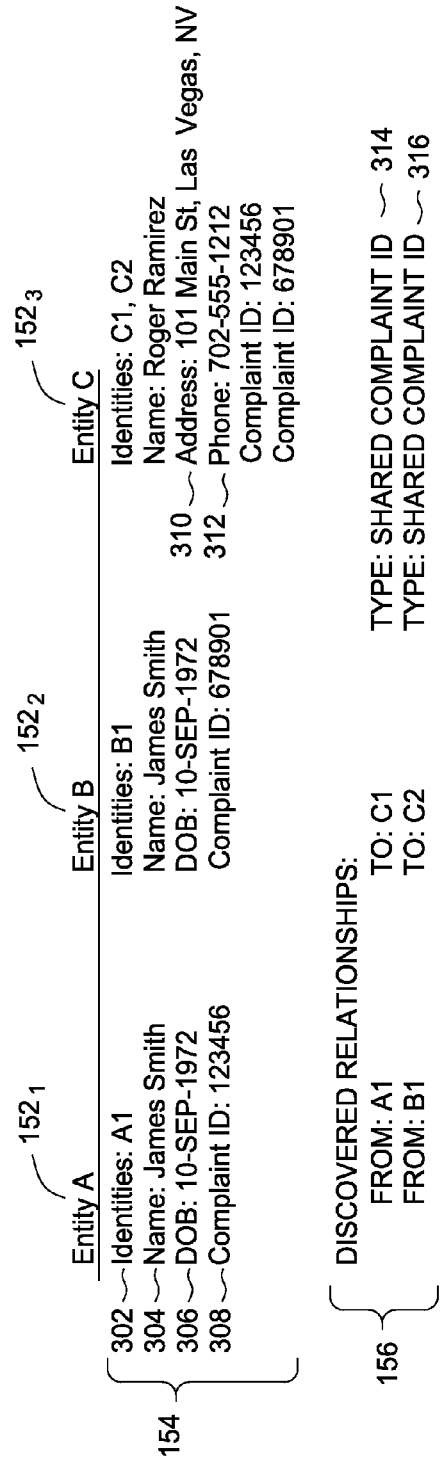
FIG. 3 illustrates another example of entities for which the application may adjust a likeness score based on discovered relationships, according to one embodiment of the invention.

FIG. 3 illustrates another example of entities for which the application 150 may adjust a likeness score based on discovered relationships, according to one embodiment of the invention. The example is presented in a context of an individual, James Smith, who has been repeatedly reported to a law enforcement agency by a restaurant owner, Roger Ramirez, for loitering. As shown in FIG. 3, the entities include entity A $154_1$, entity B $154_2$, and entity C $154_3$. Once again, assume that entity A contains the inbound identity record, that entity B is the candidate entity, and that entity C is an entity that is related to at least one of entity A and entity B. The entities include the following attributes: an identity record indicator 302, a name 304 and one or more complaint identifiers 308. In this particular example, each complaint identifier uniquely identifies a complaint filed by a law enforcement agency, where each complaint names an offender and a person filing a complaint with law enforcement. In addition, entities A and B include an attribute representing date of birth 308, and entity C includes attributes representing address 310 and phone number 312, respectively. Further, entity A includes an identity record A1, entity B includes an identity record B2 and entity C includes two identity records, C1 and C2. Each identity record is associated with a respective complaint identifier.

Suppose that, as in the previous example, the likeness score computed from entities A and B is insufficient to trigger resolving entities A and B into a single entity. In one embodiment, the application 150 infers that entities A and B are commonly related to entity C. More specifically, application 150 infers: (i) a relationship 314 between the identity records A1 and C1 based on a first matching complaint identifier and (ii) a relationship 316 between the identity records B1 and C2 based on a second matching complaint identifier. In one embodiment, the application 150 increases the likeness score between entities A and B, based on the commonly-related entity C. The likeness score is increased because it may generally be unlikely that the person filing the complaint (entity C) has reported, for the same offense, two distinct individuals having the same name and date of birth, however common the name may be. In other words, it may generally be more likely that the person filing complaint has twice reported a repeat offender. If the increased likeness score satisfies the threshold defined by the entity resolution rule, then the application 150 resolves entities A and B into a single entity.

Figure 4:
FIG. 4 illustrates an example of entities for which the application may adjust a likeness score based on disclosed relationships, according to one embodiment of the invention.

FIG. 4 illustrates an example of entities for which the application 150 may adjust a likeness score based on disclosed relationships, according to one embodiment of the invention. The example is presented in a context of an individual, Joy Sado, who is listed as a reference in an employment application of another individual, Roger Ramirez. Further, Joy is also listed as a beneficiary of an employee life insurance plan of Roger. Assume that entity A contains an inbound identity record representing Joy, that entity B is a candidate entity also representing Joy, and that entity C is an entity that is related to at least one of entity A and entity B. The entities include the following attributes: an identity record indicator 402, a name 404 and a phone number 406. In addition, entities B and C include attributes representing date of birth 408 and address 410, respectively. Further, entity A includes an identity record A1, entity B includes an identity record B2 and entity C includes two identity records, C1 and C2. Assume that C1 represents the employment application of Roger and that C2 represents the employee life insurance plan of Roger.

Suppose that the name "Joy Sado" is not a common occurrence in the entity resolution system. Consequently, a matching name and a matching phone number may be sufficient to trigger resolving entities A and B into a single entity. However, the phone number of entity B does not exactly match the phone number of entity A. For example, an error in data entry and/or processing may have resulted in the phone number of entity B differing from the phone number of entity A by a single digit. The phone numbers differing by a single digit may result in the entities A and B narrowly falling short of satisfying the threshold defined by the entity resolution rule.

On the other hand, in one embodiment, the application 150 identifies that entities A and B are commonly related to entity C. The identification is made based on: (i) a disclosed relationship 412 between the identity records C1 and A1 based on the employment reference and (ii) a disclosed relationship 414 between the identity records C2 and B1 based on the beneficiary listing. In one embodiment, the application 150 then increases the likeness score between entities A and B, based on the commonly-related entity C. The likeness score is increased because it may generally be unlikely that Roger is so closely related to two distinct individuals having the same name and a similar phone number, as to list one as an employment reference and another as a beneficiary. If the increased likeness score satisfies the threshold defined by the entity resolution rule, then the application 150 resolves entities A and B into a single entity.

The examples described above in conjunction with FIGS. 2-4 involve using relationships to avoid under-resolving entities at least in some cases. As used herein, under-resolving refers to incorrectly refraining from resolving two entities into a single entity when the two entities in fact refer to the same individual (and should be resolved). In some embodiments, the techniques disclosed herein may also be further refined to avoid over-resolving entities as a result of using relationships. As used herein, over-resolving refers to incorrectly resolving two entities into a single entity when the two entities in fact refer to distinct individuals (and should not be resolved).

In one embodiment, the technique may be refined by disregarding discovered relationships that are formed only from identity attribute values that are already shared between the first entity (containing the inbound identity record) and the candidate entity. For example, assume that entity A contains an inbound identity record and that entity B contains two attributes matching entity A: name and date of birth. Assume that entities A and B have a likeness score insufficient to resolve the entities A and B into a single entity. For example, perhaps the matching name is one that occurs commonly in the entity resolution system, e.g., "James Smith." Assume also that the application 150 infers a relationship between each of entities A and B to entity C, based on some or all of the matching attributes between entities A and B. In other words, assume that entity C also has a matching name and/or a matching date of birth.

In some embodiments, while the matching attributes in entity C may not necessarily be sufficient to have resulted in entity C being resolved to entity A or B, the matching attributes in entity C may nevertheless be sufficient for the application 150 to infer a relationship between entity C and each of entity A and B. By using the refined technique disclosed herein, the application 150 disregards the inferred relationships between entity C and each of entity A and B, preventing entity C from increasing at all the likeness score between entity A and entity B. This is because entity C contains no new information (i.e., attributes) associating entity A with entity B. Instead, the only attributes in entity C that associate entity A with entity B are already contained in entities A and B. Accordingly, the refined technique may prevent over-resolving entities as a result of using relationships between entities at least in some cases. For example, the refined technique prevents entity C from incorrectly triggering entity A and entity B to be resolved into a single entity.

Figure 5:
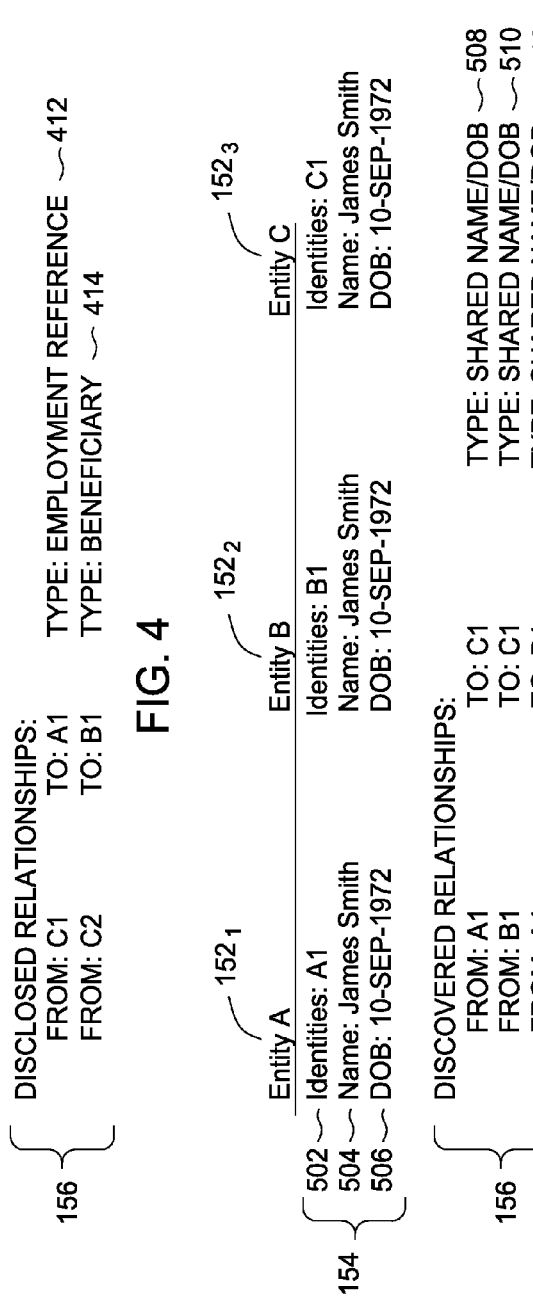
FIG. 5 illustrates an example of entities that the application may refrain from resolving as a result of relationships to a common entity, according to one embodiment of the invention.

FIG. 5 illustrates an example of entities that the application 150 may refrain from resolving as a result of relationships to a common entity, according to one embodiment of the invention. As shown, the entities A, B and C each include a respective identity record indicator 502. In addition, the entities A, B and C include the following matching attributes: a name 502, and a date of birth 506. In this particular example, the matching name is "James Smith," which commonly occurs in the entity resolution system. Accordingly, the entities A and B may have a likeness score insufficient to trigger resolving the entities A and B into a single entity. Further, the application 150 may infer a relationship between each of entities A and B to entity C, based on the matching attributes of name 502 and date of birth 506. More specifically, based on the matching attributes, the application 150 may infer relationships 508, 510, 512 between: entities A and C, entities B and C and entities A and B, respectively. On the other hand, entity C does not associate entities A and B using any new attributes, relative to the attributes entities A and B already contain. Accordingly, the application 150 disregards the inferred relationships, preventing the likeness score between entities A and B from being increased based on the inferred relationships. Accordingly, the application 150 prevents entity C from causing entities A and B to become over-resolved.

In some embodiments, alternative approaches of refining the technique to avoid over-resolving entities at least in some cases include designating each relationship as either a "likeness relationship" or a "connection relationship." As used herein, a likeness relationship refers to a relationship between entities that indicates that the entities are likely to represent the same individual. For example, a likeness relationship may be created between two entities, where the entities have a likeness score that does not satisfy a higher threshold for resolving the entities into a single entity but satisfies a lower threshold for the likeness relationship to be created between the two entities. A connection relationship refers to a relationship between entities that indicates that the entities are likely to represent distinct but related individuals. For example, a connection relationship may be created between two entities based on a disclosed relationship, such as beneficiaries on an insurance policy, emergency contacts on employment files, references on an employment application, etc. It may generally be unlikely for an individual to list himself or herself in at least some types of disclosed relationships. Once each relationship is designated as either a likeness relationship or a connection relationship, the technique may then be refined by disregarding all likeness relationships, thereby preventing any likeness relationship from increasing the likeness score. Alternatively, the technique may be refined by considering only connection relationships, thereby allowing only connection relationships to increase the likeness score.

Additionally or alternatively, in one embodiment, the technique may be refined to avoid over-resolving entities in other cases. For example, the technique may be refined to prevent overly related entities from causing two entities to be over-resolved. As used herein, overly related entities refer entities with an undesirably large number of first-degree relationships. For example, the application 150 may determine to designate an entity as an overly related entity, if the entity has a number of first-degree relationships exceeding a predefined threshold. Overly related entities may generally be more likely to cause over-resolution than entities with a smaller number of first-degree relationships.

Figure 6:
FIG. 6 illustrates an example of entities that the application may refrain from resolving as a result of an entity with an undesirably large number of relationships, according to one embodiment of the invention.

FIG. 6 illustrates an example of entities that the application 150 may refrain from resolving as a result of an entity with an undesirably large number of relationships, according to one embodiment of the invention. The example is presented in a context of rental car customers who have received traffic citations in Nevada. Assume that the rental car customers are clients of Acme Rental Car, a rental car company which has a large number of vehicles registered with the Nevada Department of Motor Vehicles (DMV). Each registration at the DMV results in a newly generated identity record, each with a respective, distinct license plate. As shown, the entities A and B each represent a customer named James Smith, while entity C represents Acme Rental Car. The entities A, B and C each include an identity record indicator 602 and a name 604. In addition, the entities A and B include a date of birth 606, a license plate 608, a citation date 610, and a driver's license 612. Entity C contains all of the newly generated identity records (and the respective, distinct license plates). For example, the application 150 may have resolved all of the newly generated identity records into a single entity, entity C, based on matching attributes such as name, phone number and address.

In this particular example, assume that entity A represents an individual, James Smith, who received a citation when driving a rental car in the year 2002, the driver holding a California driver's license at the time of the citation. Assume further that entity B represents an individual with the same name of James Smith, who received a citation when driving a different rental car in the year 2008, the driver holding a Texas driver's license at the time of the citation. Assume also that entities A and B have matching dates of birth. As described above, matching names and dates of birth may typically be sufficient to trigger resolving entities A and B into a single entity. However, because the name "James Smith" occurs commonly in the entity resolution system, entities A and B may have a likeness score that falls just short of the threshold for resolving entities A and B into a single entity.

In one embodiment, the technique is refined to disregard any overly related entities, preventing any relationships to the overly related entities from incorrectly causing two entities to be resolved into a single entity. As described above, the application 150 may determine to designate an entity as an overly related entity, if the entity has a number of relationships exceeding a predefined threshold. The predefined threshold may be user-specified and/or may be determined based on a specified percentile of entities in the entity resolution system, according to relationship count. For example, in one embodiment, entities in the top twenty percentile based on relationship count may be disregarded by the application 150. The refined technique may be used to prevent Acme Rental Car (entity C) from incorrectly causing entity A and B to be resolved into a single entity.

Granted, it may be possible that between the years 2002 and 2008, a single individual by the name of James Smith moved from California to Texas and visited Nevada on multiple occasions, receiving both citations while in Nevada. On the other hand, if Acme Rental Car is a large company with thousands of customers, it may be just as likely that two individuals, both named James Smith, separately visited Nevada from California and Texas, respectively, each receiving a respective citation while in Nevada. The likelihood of the entities referring to two distinct individuals may be, at least to some extent, commensurate with the number of first-degree relationships of Acme Rental Car and/or the commonality of the name of James Smith. Accordingly, by using the refined technique, the application 150 may avoid over-resolving entities in such cases.

Figure 7:
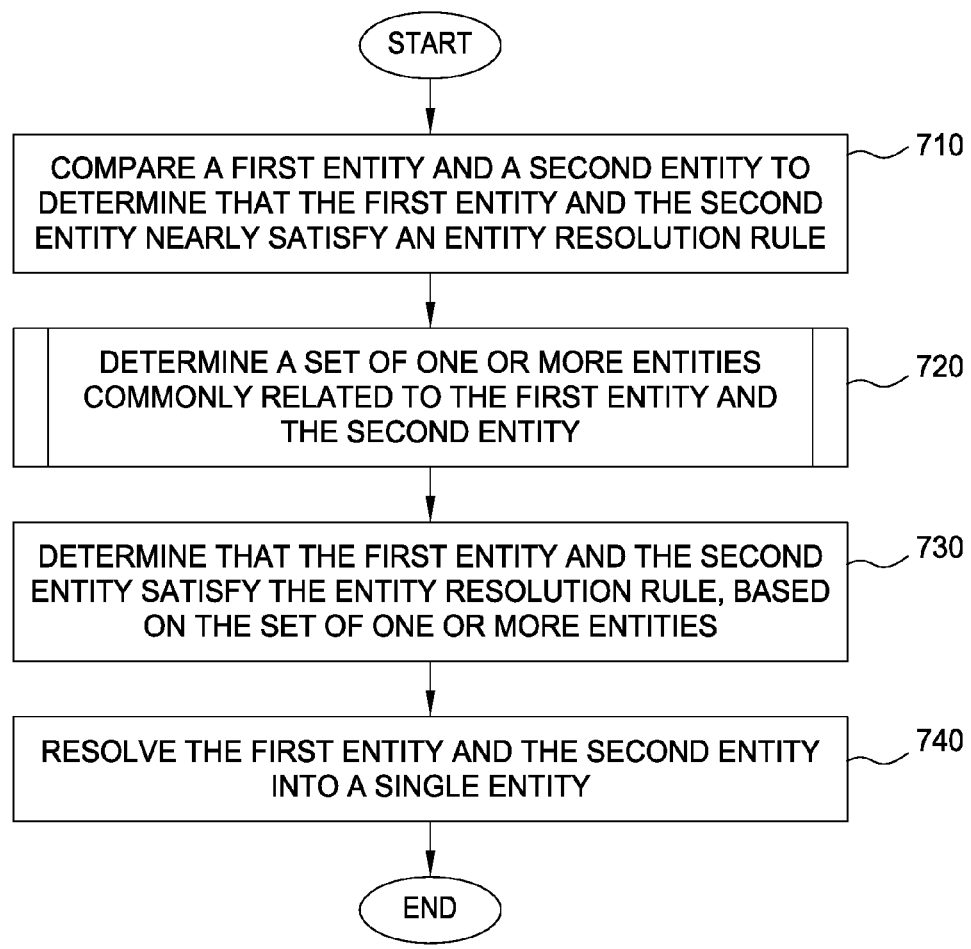
FIG. 7 is a flowchart depicting a method for resolving entities based on relationships to a common entity, according to one embodiment of the invention.

FIG. 7 is a flowchart depicting a method 700 for resolving entities based on relationships to a common entity, according to one embodiment of the invention. As shown, the method 700 begins at step 710, where the application 150 compares a first entity and a second entity to determine that the first entity and the second entity nearly satisfy an entity resolution rule. The first entity may contain an inbound identity record, and the second entity may be a candidate entity. As described above, the entity resolution rule specifies criteria for resolving the first entity and the second entity into a single entity. Nearly satisfying the entity resolution rule includes having a likeness score falling short, by no more than a prescribed extent, of a threshold defined by the entity resolution rule.

At step 720, the application 150 determines a set of one or more entities commonly related to the first entity and the second entity, where the set of one or more entities include at least a third entity. The one or more entities may be determined by traversing a relationship graph containing disclosed and/or discovered relationships. The step 720 is further described below in conjunction with FIG. 8. At step 730, the application 150 determines that the first entity and the second entity satisfy the entity resolution rule, based on the set of one or more entities. For example, the likeness score between the first and second entities may be increased based on the one or more entities, the increased likeness score satisfying the threshold defined by the entity resolution rule. At step 740, the application 150 then resolves the first and second entities into a single entity. After the step 740, the method 700 terminates.

Figure 8:
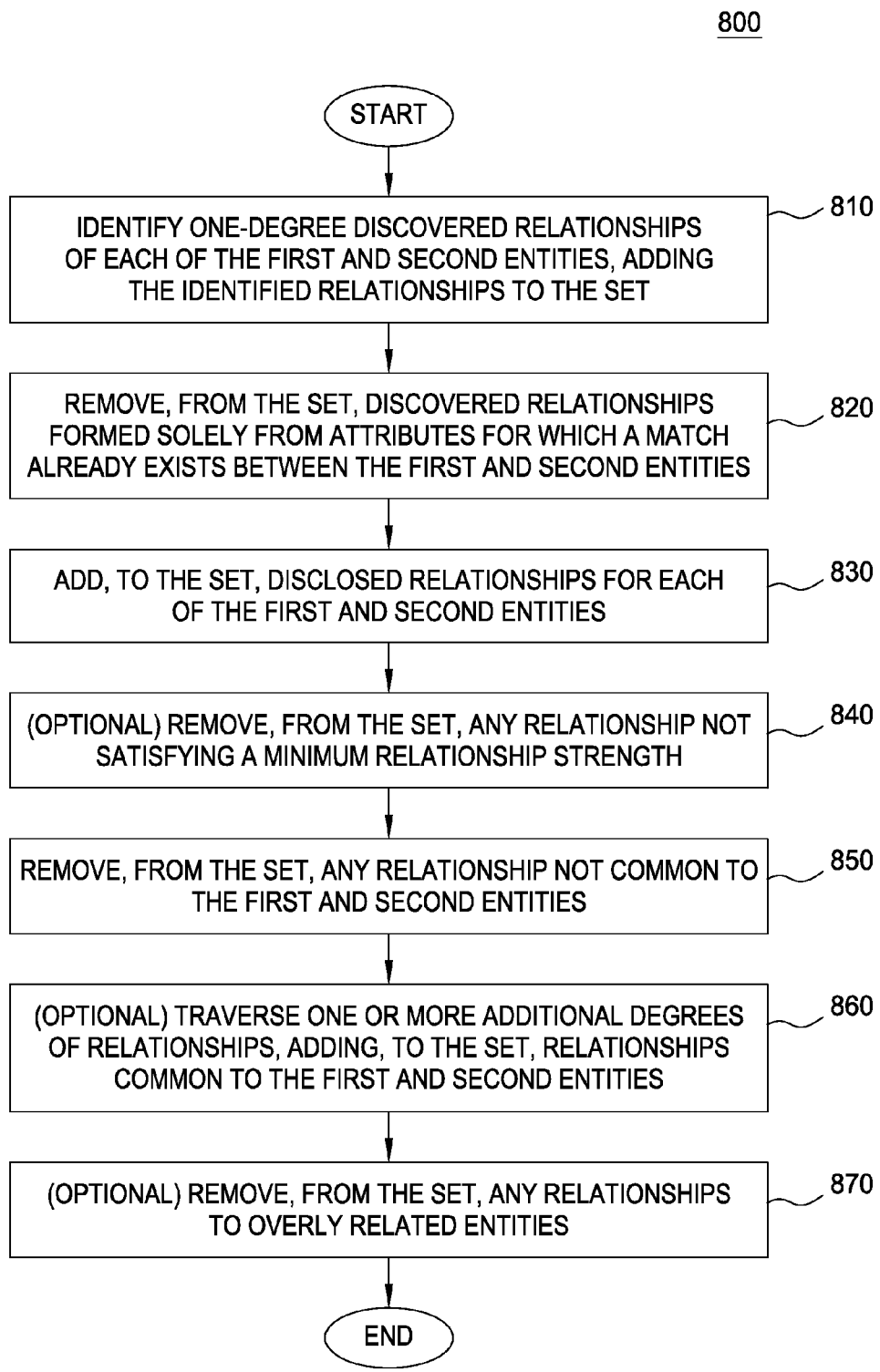
FIG. 8 is a flowchart depicting a method for determining a set of one or more common entities, according to one embodiment of the invention.

FIG. 8 is a flowchart depicting a method 800 for determining a set of one or more entities commonly related to the first and second entities of FIG. 7, according to one embodiment of the invention. The method 800 corresponds to step 720 of FIG. 7. Further, although embodiments are described herein with reference to the underlying representation of the set being in the form of relationships, other embodiments are broadly contemplated. For example, the underlying representation of the set may be in the form of entities, rather than relationships. For instance, that entity C is commonly related to entities A and B may be represented in the form of entities (i.e., as a set containing the entity C) rather than in the form of relationships (i.e., a set containing a first relationship between A and C and a second relationship between B and C). In this particular context, entity C may be interchangeably referred to as an entity related to/a relationship of entity A and/or entity B.

As shown, the method 800 begins at step 810, where the application 150 identifies all one-degree discovered relationships of each of the first and second entities, except any relationship between the first and second entities. The application 150 may add the identified relationships to the set. At step 820, the application 150 may remove, from the set, discovered relationships formed solely from attributes for which a match already exists between the first and second entities. For example, the application 150 may remove, from the set, the relationships 508, 510, 512 (and/or the entity C 154$_3$) of FIG. 5. At step 830, the application 150 adds to the set, disclosed relationships for each of the first and second entities, except any relationship between the first and second entities. At step 840, the application 150 optionally removes, from the set, any relationship not satisfying a minimum relationship strength, so that only relationships exceeding a desired strength are considered in determining commonly related entities.

At step 850, the application 150 removes any relationship to any third entity that is not common to the first and second entities, resulting in a set of commonly related entities. At step 860, the application 150 optionally traverses, in the set, one or more additional degrees of relationships, adding to the set any entities found to be commonly related to the first and second entities. At step 870, the application 150 optionally removes, from the set, any relationships to entities identified as overly related entities. For example, the application 150 may remove, from the set, the relationships 618 and 620 (and/or the entity C 154$_3$) of FIG. 6. After the step 870, the method 800 terminates.

Figure 9:
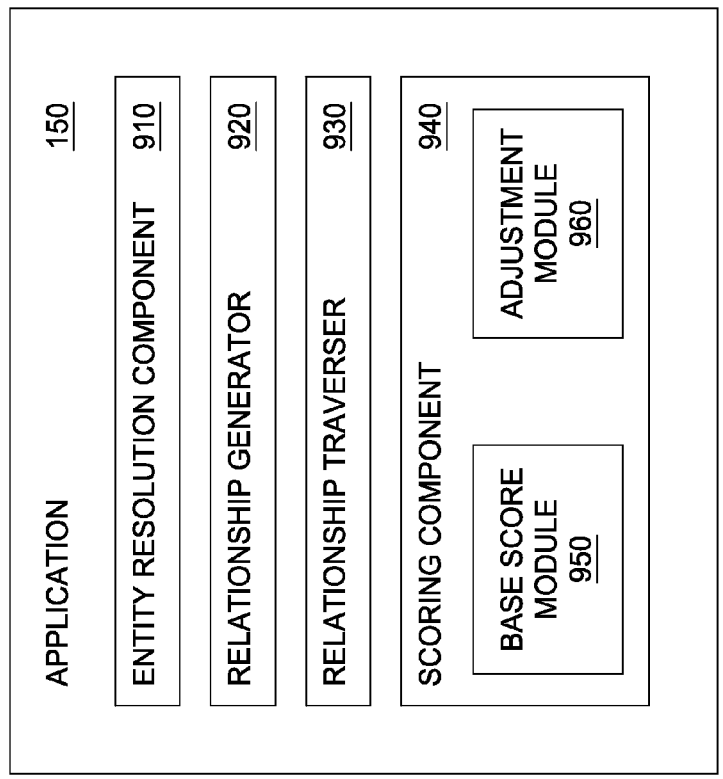
FIG. 9 is a block diagram depicting components of the application for entity resolution, according to one embodiment of the invention.

FIG. 9 is a block diagram depicting components 900 of the application 150 of FIG. 1A, according to one embodiment of the invention. As shown, the components 900 include an entity resolution component 910, a relationship generator 920, a relationship traverser 930 and a scoring component 940. The scoring component 940 includes a base score module 950 and an adjustment module 960. In one embodiment, the entity resolution component 910 is configured to resolve multiple entities into a single entity or split a single entity into multiple entities. To this end, the entity resolution component 910 applies one or more entity resolution rules. Accordingly, the entity resolution component 910 may perform the step 740 of FIG. 7. The relationship generator 920 is configured to create and store inferred relationships between entities, based on attributes contained in the entities and predefined relationship criteria. For example, the relationship generator 920 may perform part or all of step 810 of FIG. 8.

In one embodiment, the relationship traverser 930 is configured to explore a relationship graph to identify commonly related entities. To this end, the relationship traverser 930 may apply predefined traversal criteria. Examples of traversal criteria include relationship strength, degrees of separation, count of relationships, etc. Accordingly, the relationship traverser 930 may perform steps 820 through 870 of FIG. 8. The scoring component 940 is configured to compute a likeness score representing, at least in part, a degree to which attributes of a first entity match attributes of a second entity. To this end, the scoring component 940 applies one or more predefined scoring rules. Accordingly, the scoring component 940 may perform part or all of the steps 710 and/or 730 of FIG. 7. In embodiments where the likeness score is computed via two phases, the base score module 950 performs part or all of the step 710, and the adjustment module 960 performs part or all of the step 730.

Advantageously, embodiments of the invention provide techniques for performing resolving entities based on relationships to a common entity. One embodiment provides an application for entity resolution. The application compares two entities to determine that an entity resolution threshold is nearly satisfied, where the entity resolution threshold refers to a threshold for resolving two entities into a single entity. The application determines one or more entities commonly related to the two entities. The application then determines that the two entities satisfy the entity resolution threshold on the basis of the one or more commonly-related entities. The application then resolves the two entities into a single entity. Advantageously, the application may resolve entities more accurately at least in some cases, relative to alternative approaches. More specifically, entity under-resolution may be reduced, while minimizing any increase in entity over-resolution as a result of using the techniques disclosed herein.

In one embodiment, entities may be resolved more accurately especially in cases where the amount and/or quality of captured data is low. An example of a low amount of data is where only a name and date of birth is recorded for many individuals. An example of a low quality of data is where there are many inconsistencies in the captured data, perhaps resulting from errors in data entry and/or data processing. For example, the data may include many identity records, each with what appears to be a different misspelling of the name "James Smith." The techniques herein may be used to reduce occurrences of the identity records spanning a large number of sparsely-populated entities in the entity resolution system, when the identity records should in fact be resolved into a single entity.

As described above, the application may resolve entities more accurately at least in some cases, relative to alternative approaches. An example of an alternative approach is one that includes selectively enabling resolving entities based on a common name and/or changing the thresholds specified in the entity resolution rule, without considering relationships to common entities in resolving entities. Although the alternative approach may reduce under-resolution to some extent, over-resolution may occur much more frequently as a result. At least in some embodiments, the extent to which over-resolution may occur much more frequently may be measured using probabilistic techniques associated with the birthday problem in probability theory. The birthday problem pertains to the probability that, in a set of randomly chosen persons, some pair of persons will have the same date of birth. As an example, entities in the entity resolution system may often contain only a name and a date of birth. There are approximately 18,250 distinct dates of birth in a span of fifty years, excluding the additional day in leap years. Assume that each distinct date of birth is loaded into the entity resolution system and that a given name is associated with 160 distinct dates of birth. In this particular example, there may be approximately a fifty percent likelihood of one of the dates of birth belonging to two distinct individuals who have the same name. Further, in the context of New York City, which has a population of approximately eight million individuals, approximately half of which are males, there may likely be 1,320 distinct individuals named "James Smith" in New York City. If four hundred of the distinct individuals are loaded into the entity resolution system, then there may be approximately a 98.8% probability that two of the individuals have the same date of birth. This is because the probability is based on a number of pair-wise combinations of: (i) individuals and (ii) dates of birth. Because the probability that two distinct individuals have the same date of birth is high, over-resolution may occur much more frequently as a result of using the alternative approach.

While the foregoing is directed to embodiments of the present invention, other and further embodiments of the invention may be devised without departing from the basic scope thereof, and the scope thereof is determined by the claims that follow.

What is claimed is:

1. A computer-implemented method of entity resolution based on relationships to common entities, the method comprising:

determining a likeness score between a first entity and a second entity in an entity resolution system, each entity comprising one or more identity records representing a corresponding physical entity assumed to exist by the entity resolution system, each identity record comprising a data record containing one or more attributes characterizing the corresponding physical entity;

determining that the likeness score does not satisfy a defined threshold for resolving the first entity and the second entity into a single entity;

identifying a set of one or more entities related to the first entity and a set of one or more entities related to the second entity, wherein the identified sets include: (i) a set of one-degree discovered relationships of the first and second entities and (ii) a set of disclosed relationships of the first and second entities; wherein at least one discovered relationship that is formed solely from attributes for which a match already exists between the first entity and the second entity is removed from the identified sets;

removing, from the set of one or more entities, at least one relationship to an overly related entity;

removing, from the set of one or more entities, at least one relationship not satisfying a minimum relationship strength;

adjusting the likeness score based on an intersect of the two sets and by operation of one or more computer processors, wherein the intersect includes at least a third entity and excludes at least one relationship in the identified sets, that is not common to the first and second entities; and upon determining that the adjusted likeness score satisfies the defined threshold, determining that the first entity and the second entity represent the same physical entity within the entity resolution system.

2. The computer-implemented method of claim 1, wherein the likeness score is determined by comparing attributes of the first entity and the second entity, and wherein the second entity is a candidate entity.

3. The computer-implemented method of claim 1, wherein the third entity is selected from a set of entities identified based on at least one of: (i) degrees of separation from the first entity or the second entity and (ii) an associated relationship strength; wherein any relationship between the first entity and the second entity is disregarded in identifying the set of entities, wherein at least one relationship comprises one of a discovered relationship and a disclosed relationship, and wherein any discovered relationship based only on one or more attribute values shared by the first and second entities is disregarded in identifying the set of entities.

4. The computer-implemented method of claim 1, wherein the third entity has a degree of separation not exceeding a predefined threshold, wherein the degree of separation is measured from at least one of the first entity and the second entity.

5. The computer-implemented method of claim 1, wherein the third entity has a count of one-degree relationships not exceeding a predefined threshold.

6. The computer-implemented method of claim 1, wherein the likeness score is adjusted based on at least one of: (i) an extent of the intersect; (ii) a measure of a strength of a relationship between: (A) at least the third entity and (B) at least one of the first entity and the second entity; and (iii) a count of degrees of separation between: (A) at least the third entity and (B) at least one of the first entity and the second entity.

7. The computer-implemented method of claim 1, wherein the method is to resolve entities based on relationships to a set of common entities, wherein the first entity, the second entity, and the third entity are distinct entities, wherein the set of entities related to the first entity does not include the second entity, wherein the set of entities related to the second entity does not include the first entity.

8. The computer-implemented method of claim 7, further comprising:

traversing at least one additional degree of relationships, wherein at least one relationship common to the first and second entities is added.

9. The computer-implemented method of claim 8, wherein the entity resolution system includes an entity resolution application configured to perform the method, wherein the entity resolution application comprises:
  (i) an entity resolution component configured to apply one or more entity resolution rules to combine and split entities;
  (ii) a relationship generator component configured to infer relationships between entities, based on attributes contained in the entities and based further on predefined relationship criteria;
  (iii) a relationship traverse component configured to explore a relationship graph based on predefined traversal criteria, to identify commonly related entities; and
  (iv) a scoring component configured to generate a likeness score representing, at least in part, a degree to which respective sets of attributes of the first entity and the second entity match, wherein the scoring component includes:
    (A) a base score module configured to determine the likeness score between the first entity and the second entity; and
    (B) an adjustment score module configured to adjust the likeness score based on the intersect of the two sets.

10. The computer-implemented method of claim 9, wherein the likeness score is determined by comparing attributes of the first entity and the second entity, wherein the second entity is a candidate entity;
  wherein entity resolution application is configured to select the third entity from a set of entities identified based on each of: (i) a count of degrees of separation from at least one of the first entity and the second entity and (ii) an associated relationship strength;
  wherein any relationship between the first entity and the second entity is disregarded in identifying the set of entities, wherein at least a first relationship comprises a discovered relationship, wherein at least a second relationship comprises a disclosed relationship, wherein any discovered relationship based only on one or more attribute values shared by the first and second entities is disregarded in identifying the set of entities.

11. The computer-implemented method of claim 10, wherein the third entity has a count of degrees of separation not exceeding a predefined threshold, wherein the count of degrees of separation is measured from at least one of the first entity and the second entity, wherein the third entity has a count of one-degree relationships not exceeding a predefined threshold count;
  wherein the entity resolution application is further configured to adjust the likeness score based on each of: (i) an extent of the intersect; (ii) a measure of a strength of a relationship between: (A) at least the third entity and (B) at least one of the first entity and the second entity; and (iii) a count of degrees of separation between: (A) at least the third entity and (B) at least one of the first entity and the second entity.

12. The computer-implemented method of claim 11, wherein at least the third entity excludes any entity satisfying a threshold of likeness to at least one of the first and second entities, wherein satisfying the threshold of likeness includes having a relationship with at least one of the first and second entities, wherein the relationship is based solely on one or more identity attributes common to the first and second entities;
wherein each relationship comprises one of a likeness relationship and a connection relationship, wherein a third relationship comprises a likeness relationship, wherein a fourth relationship comprises a connection relationship, wherein entities having a discovered relationship to at least one of the first and second entities and satisfying a threshold of likeness are designated as having a likeness relationship, wherein entities having a disclosed relationship to at least one of the first and second entities are designated as having a connection relationship.

13. A computer program product for entity resolution based on relationships to common entities, the computer program product comprising:
  a computer-readable storage medium having computer-readable program code embodied therewith, the computer-readable program code comprising:
  computer-readable program code configured to determine a likeness score between a first entity and a second entity in an entity resolution system, each entity comprising one or more identity records representing a corresponding, physical entity assumed to exist by the entity resolution system, each identity record comprising a data record containing one or more attributes characterizing the corresponding physical entity;
  computer-readable program code configured to determine that the likeness score does not satisfy a defined threshold for resolving the first entity and the second entity into a single entity;
  computer-readable program code configured to identify a set of one or more entities related to the first entity and a set of one or more entities related to the second entity, wherein the identified sets include: (i) a set of one-degree discovered relationships of the first and second entities and (ii) a set of disclosed relationships of the first and second entities; wherein at least one discovered relationship that is formed solely from attributes for which a match already exists between the first entity and the second entity is removed from the identified sets;
  computer-readable program code configured to remove, from the set of one or more entities, at least one relationship to an overly related entity;
  computer-readable program code configured to remove, from the set of one or more entities, at least one relationship not satisfying a minimum relationship strength;
  computer-readable program code configured to adjust the likeness score based on an intersect of the two sets and by operation of one or more computer processors when executing the computer-readable program code, wherein the intersect includes at least a third entity and excludes at least one relationship in the identified sets, that is not common to the first and second entities; and
  computer-readable program code configured to, upon determining that the adjusted likeness score satisfies the defined threshold, determining that the first entity and the second entity represent the same physical entity within the entity resolution system.

14. The computer program product of claim 13, wherein the likeness score is determined by comparing attributes of the first entity and the second entity, and wherein the second entity is a candidate entity.

15. The computer program product of claim 13, wherein the third entity is selected from a set of entities identified based on at least one of: (i) degrees of separation from the first entity or the second entity and (ii) an associated relationship strength; wherein any relationship between the first entity and the second entity is disregarded in identifying the set of entities, wherein at least one relationship comprises one of a discovered relationship and a disclosed relationship, and wherein any discovered relationship based only on one or more attribute values shared by the first and second entities is disregarded in identifying the set of entities.

16. The computer program product of claim 13, wherein the third entity has a degree of separation not exceeding a predefined threshold, wherein the degree of separation is measured from at least one of the first entity and the second entity.

17. The computer program product of claim 13, wherein the third entity has a count of one-degree relationships not exceeding a predefined threshold.

18. The computer program product of claim 13, wherein the likeness score is adjusted based on at least one of: (i) an extent of the intersect; (ii) a measure of a strength of a relationship between: (A) at least the third entity and (B) at least one of the first entity and the second entity; and (iii) a count of degrees of separation between: (A) at least the third entity and (B) at least one of the first entity and the second entity.

19. A system for entity resolution based on relationships to common entities, the system comprising:
   one or more computer processors;
   a memory containing a program, which when executed by the one or more computer processors is configured to perform an operation comprising:
      determining a likeness score between a first entity and a second entity in an entity resolution system, each entity comprising one or more identity records representing a corresponding, physical entity assumed to exist by the entity resolution system, each identity record comprising a data record containing one or more attributes characterizing the corresponding physical entity;
      determining that the likeness score does not satisfy a defined threshold for resolving the first entity and the second entity into a single entity;
      identifying a set of one or more entities related to the first entity and a set of one or more entities related to the second entity, wherein the identified sets include: (i) a set of one-degree discovered relationships of the first and second entities and (ii) a set of disclosed relationships of the first and second entities;
   wherein at least one discovered relationship that is formed solely from attributes for which a match already exists between the first entity and the second entity is removed from the identified sets;
      removing, from the set of one or more entities, at least one relationship to an overly related entity;
      removing, from the set of one or more entities, at least one relationship not satisfying a minimum relationship strength;
      adjusting the likeness score based on an intersect of the two sets, wherein the intersect includes at least a third entity and excludes at least one relationship in the identified sets, that is not common to the first and second entities; and
      upon determining that the adjusted likeness score satisfies the defined threshold, determining that the first entity and the second entity represent the same physical entity within the entity resolution system.

20. The system of claim 19, wherein the likeness score is determined by comparing attributes of the first entity and the second entity, and wherein the second entity is a candidate entity.

21. The system of claim 19, wherein the third entity is selected from a set of entities identified based on at least one of: (i) degrees of separation from the first entity or the second entity and (ii) an associated relationship strength; wherein any relationship between the first entity and the second entity is disregarded in identifying the set of entities, wherein at least one relationship comprises one of a discovered relationship and a disclosed relationship, and wherein any discovered relationship based only on one or more attribute values shared by the first and second entities is disregarded in identifying the set of entities.

22. The system of claim 19, wherein the third entity has a degree of separation not exceeding a predefined threshold, wherein the degree of separation is measured from at least one of the first entity and the second entity.

23. The system of claim 19, wherein the third entity has a count of one-degree relationships not exceeding a predefined threshold.

24. The system of claim 19, wherein the likeness score is adjusted based on at least one of: (i) an extent of the intersect; (ii) a measure of a strength of a relationship between: (A) at least the third entity and (B) at least one of the first entity and the second entity; and (iii) a count of degrees of separation between: (A) at least the third entity and (B) at least one of the first entity and the second entity.

* * * * *